United States Patent [19]
Lee

[11] Patent Number: 5,559,560
[45] Date of Patent: Sep. 24, 1996

[54] CAPTION LINE FINDING CIRCUIT FOR PICTORIAL SIGNAL PROCESSOR

[75] Inventor: Chang Y. Lee, Seoul, Rep. of Korea

[73] Assignee: LG Electronics Inc., Seoul, Rep. of Korea

[21] Appl. No.: 502,846

[22] Filed: Jul. 14, 1995

[30] Foreign Application Priority Data

Jul. 15, 1994 [KR] Rep. of Korea .................. 17120/1994

[51] Int. Cl.$^6$ .................................................. H04N 7/087
[52] U.S. Cl. .......................................... 348/465; 348/468
[58] Field of Search ..................... 348/465, 468, 348/478, 180; H04N 7/087

[56] References Cited

U.S. PATENT DOCUMENTS 5,223,930  6/1993  Zato .
5,453,794  9/1995  Ezaki ...................... 348/465
5,453,795  9/1995  Tults ....................... 348/465

*Primary Examiner*—Victor R. Kostak

[57] ABSTRACT

An improved caption line finding circuit for a pictorial signal processor, which in a circuit capable of extracting a data of a horizontal scanning line of a pictorial signal, includes a synchronous signal detector for detecting a vertical synchronous signal and a horizontal synchronous signal from a pictorial signal applied thereto; and a caption decoder for detecting a caption data contained in a scanning line from a pictorial signal data using a signal obtained by counting a certain horizontal synchronous signal among horizontal synchronous signals outputted from the synchronous signal detector from the time when a vertical synchronous signal is outputted thereto from the synchronous signal detector and using a signal obtained by counting for a predetermined time from the time when a vertical synchronous signal is outputted thereto from the synchronous signal detector.

14 Claims, 4 Drawing Sheets

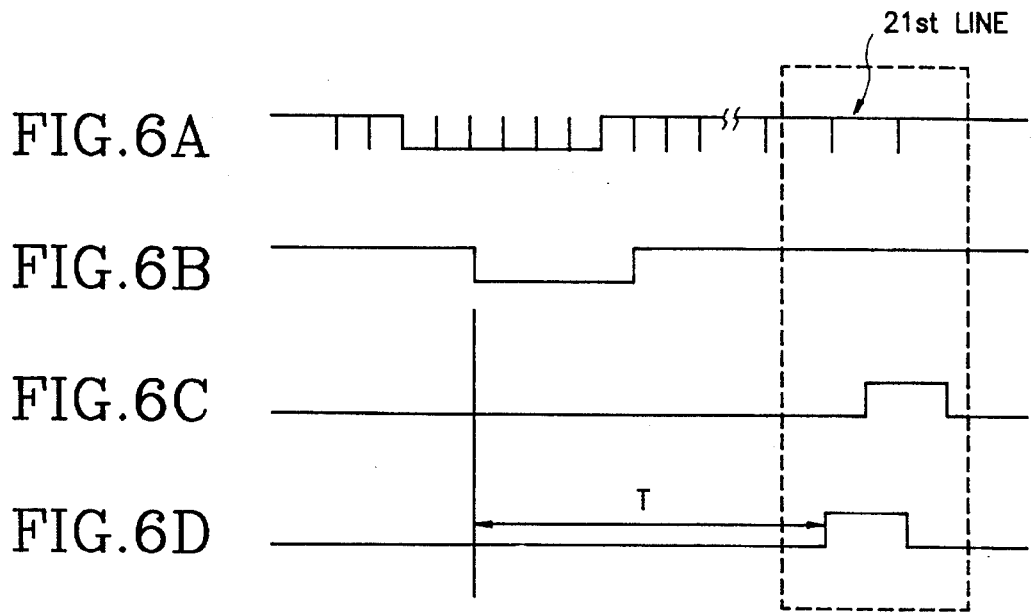
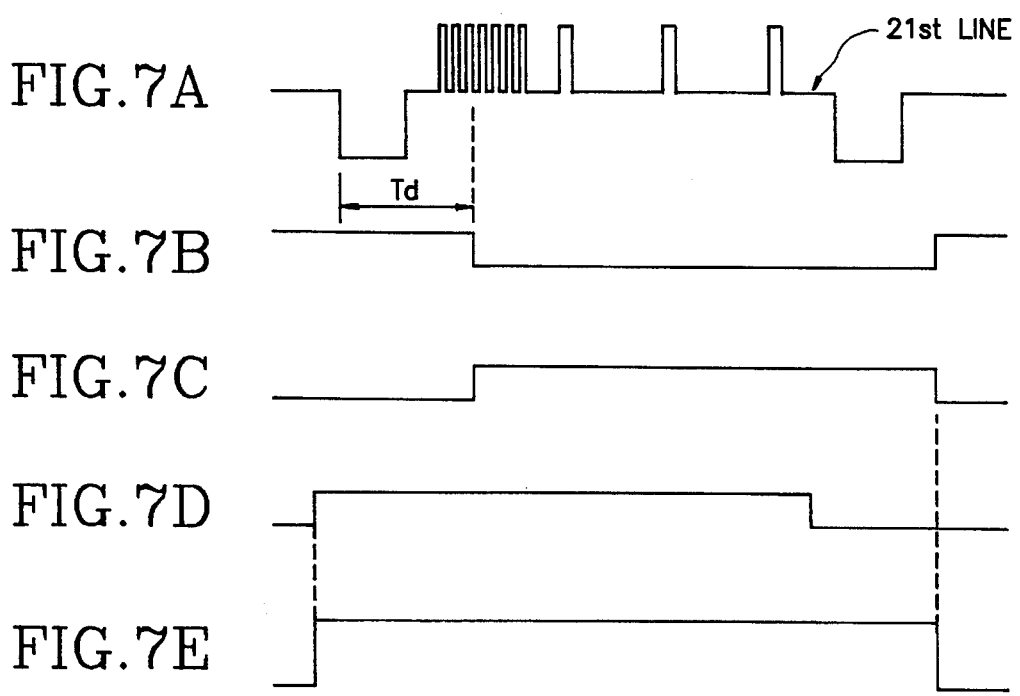

CAPTION LINE FINDING CIRCUIT FOR PICTORIAL SIGNAL PROCESSOR

BACKGROUND OF THE INVENTION

1. Field of the Invention

The present invention relates to a caption line finding circuit for a video signal processor, and in particular to an improved caption line finding circuit for a video signal processor capable of more correctly finding a caption line, in which a caption data is contained, among pictorial signals.

2. Description of the Conventional Art

A caption means that a certain character is displayed on a screen of a television after caption data contained in an encoded video signal is decoded.

Referring to FIG. 1, a conventional caption line finding circuit for a video signal processor includes a synchronous tip clamp 1 for clamping a video signal VID inputted thereto at a pulse level of a horizontal synchronous signal, a data slicer 2 for slicing a video signal into small data units as a direct current voltage is inputted to a first input terminal thereof and a video signal is inputted to a second other input terminal thereof, a line finder 3 for finding a scanning line, in which a caption data is contained, from a video signal outputted from the synchronous tip clamp 1 using vertical and horizontal frequencies inputted thereto, a logic unit 4 for determining an appropriate sampling rate for recovering an encoded caption data after being enabled by the output signal of the line finder 3, a digital/analog converter 5 for converting the output signal of the logic unit 4 into a digital/analog signal and for outputting a direct current voltage which can be a slicing level, a filter 6 for filtering the output signal of the D/A converter 5 and for outputting the filtered signal to the data slicer 2, and a sampling unit 7 for sampling the video signal outputted from the data slicer 2 in accordance with a control signal of the logic unit 4. Here, a dot clock is applied to the line finder 3 and the logic unit 4, respectively, for a sampling operation, and an automatic/manual control signal AUTO/MAN is applied to the logic unit 4 in order to control the level of a slicing operation.

The operation of the conventional caption line finding circuit for a video signal processor will now be explained with reference to FIGS. 2 and 3.

The caption line finding circuit is controlled by a microprocessor (not shown) provided at a predetermined location in a television. The video signal is inputted to the synchronous tip clamp 1. At this time, the synchronous tip clamp 1 clamps the pictorial signal, inputted to the synchronous tip clamp 1, to a horizontal synchronous tip level. The output signal of the synchronous tip clamp 1 is inputted to the second input of the data slicer 2 and is converted into a voltage pulse of a logic level. Here, the first side of the data slicer 2 receives a DC level voltage. In addition, the logic unit 4, which is enabled by the output signal of the line finder 3, selects an appropriate sampling rate in order to recover the caption data encoded in accordance with a control signal of a corresponding program. Thereafter, the sampling unit 7 samples the signal outputted from the data slicer 2 in accordance with a control signal of the logic unit 4. The sampled data is decoded by a control circuit (not shown) and is displayed on the screen of a television in certain characters. Meanwhile, the D/A converter 5 converts the output signal of the logic unit 4 into a D/A signal and outputs a DC voltage level, which is a slicing level, to the filter 6. Thereafter, the filter 6 filters the output signal of the D/A converter 5 and outputs the filtered signal to the data slicer 2.

The above described operation will now be explained with reference to FIG. 3.

When a video signal is inputted, a certain odd or even field is selected, and the pulse number of a horizontal synchronous signal is set as 17 (seventeen), and a vertical synchronous signal is detected. Thereafter, whether the current signal inputted thereto is an odd field or an even field is tested. As a result of the test, if the current pictorial signal is not a desired field, a step which detects a vertical synchronous signal V is repeated until the desired one is detected. However, as a result of the test, if the current field is a desired one, the pulse number N of the horizontal synchronous signal is counted, and whether a clock run-in signal is present or not is checked. As a result of the check, if the clock run-in signal is not present, the pulse number N of the horizontal synchronous signal is increased by 1 (one). If the pulse number N is within a range of 15<N<20, the step which detects a vertical synchronous signal V is performed. If the pulse number N is not within a range of 15<N<20, the step which detects a vertical synchronous signal V is performed again after the current field is changed to another field, and the pulse number N is set as 15. However, if the clock run-in signal is present, the data is sampled and loaded to a certain shift register after the sample clock is synchronized with the clock run-in signal. If the start bit is "001" which can be one of the caption data start condition in the loaded data, the loaded data is recognized as a caption data, so the encoded caption data is decoded and outputted. Meanwhile, if the start bit is not "001," a condition that there is no caption data is recognized, so the step which increases N by 1 (one) and detects the vertical horizontal signal V is performed.

However, the conventional caption line finding circuit for a video signal processor has disadvantages in that a tape may be elongated due to the temperature variation, and a horizontal scanning line in a video signal can be missed, resulting in the caption line not being found.

SUMMARY OF THE INVENTION

Accordingly, it is an object of the present invention to provide a caption line finding circuit for a video signal processor which overcomes the problems encountered in the conventional caption line finding circuit for a video signal processor.

It is another object of the present invention to provide an improved caption line finding circuit for a video signal processor capable of correctly finding a caption line, in which a caption data is contained, among video signals.

To achieve the above objects, there is provided a caption line finding circuit for a video signal processor which, in a circuit capable of extracting a data of a horizontal scanning line of a video signal, includes a synchronous signal detector for detecting a vertical synchronous signal and a horizontal synchronous signal from a video signal applied thereto; and a caption decoder for detecting caption data contained in a scanning line from video signal data using a signal obtained by counting a certain horizontal synchronous signal among horizontal synchronous signals outputted from the synchronous signal detector from the time when a vertical synchronous signal is outputted thereto from the synchronous signal detector and using a signal obtained by counting for a predetermined time from the time when a vertical synchronous signal is outputted thereto from the synchronous signal detector.

BRIEF DESCRIPTION OF THE DRAWINGS

FIG. 6A is a wave form of a video signal according to the present invention.

FIG. 6B is a wave form of a vertical synchronous signal of a video signal according to the present invention.

FIG. 6C is a wave form of the 21st horizontal synchronous signal of a video signal according to the present invention.

FIG. 6D is a wave form of a signal obtained after counting an absolute time of a 21st horizontal synchronous signal of a video signal according to the present invention.

FIGS. 7A, 7C, and 7D are wave forms of an enlarged portion of a dotted-line box of FIGS. 6A, 6C, and 6D, respectively, according to the present invention.

FIG. 7B is a wave form of a horizontal synchronous signal of a video signal having a delay time according to the present invention.

FIG. 7E is a wave form of an output signal of an OR-gate of FIG. 5 according to the present invention.

DETAILED DESCRIPTION OF THE INVENTION

Figure 1:
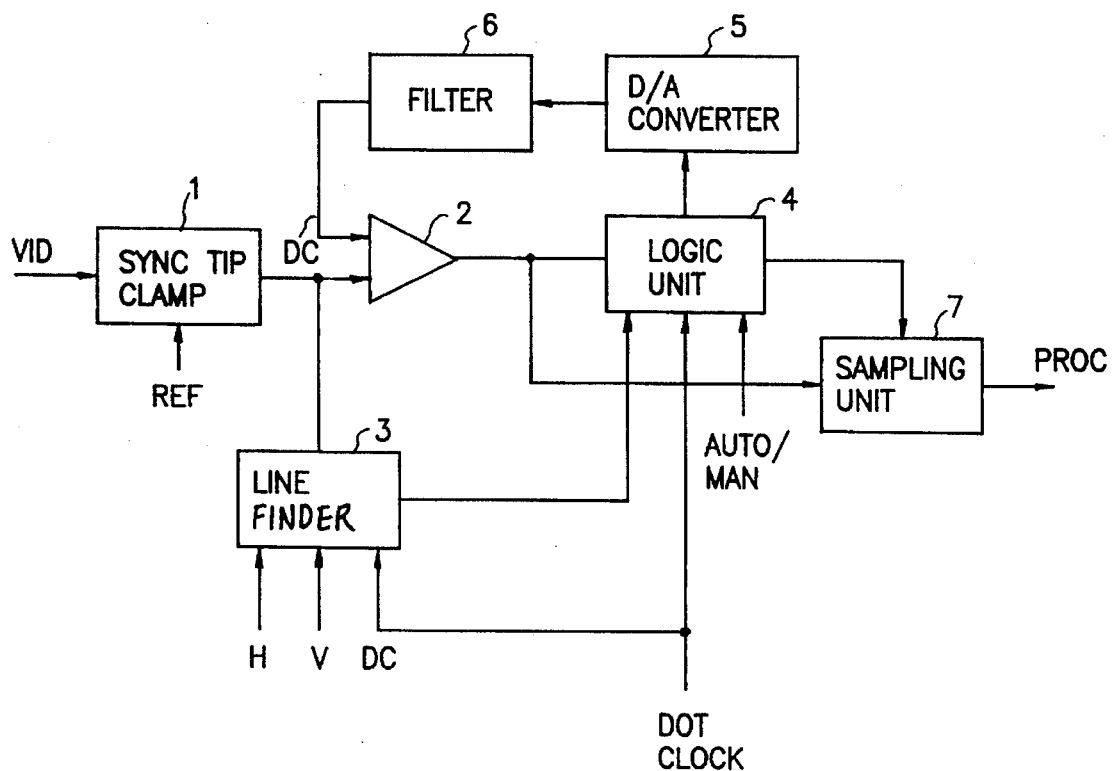
FIG. 1 is a block diagram of a conventional caption line finding circuit for a pictorial signal processor.
Figure 2:
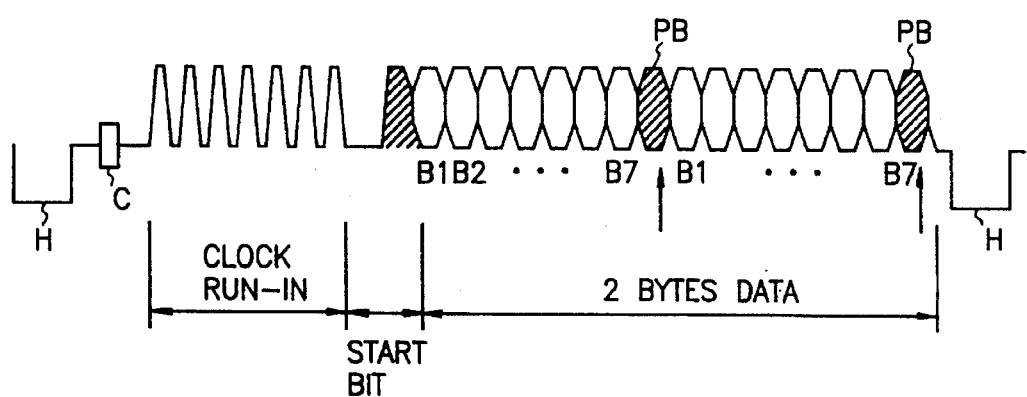
FIG. 2 is a wave form of a format of a caption signal of a conventional caption line finding circuit for a pictorial signal processor.
Figure 3:
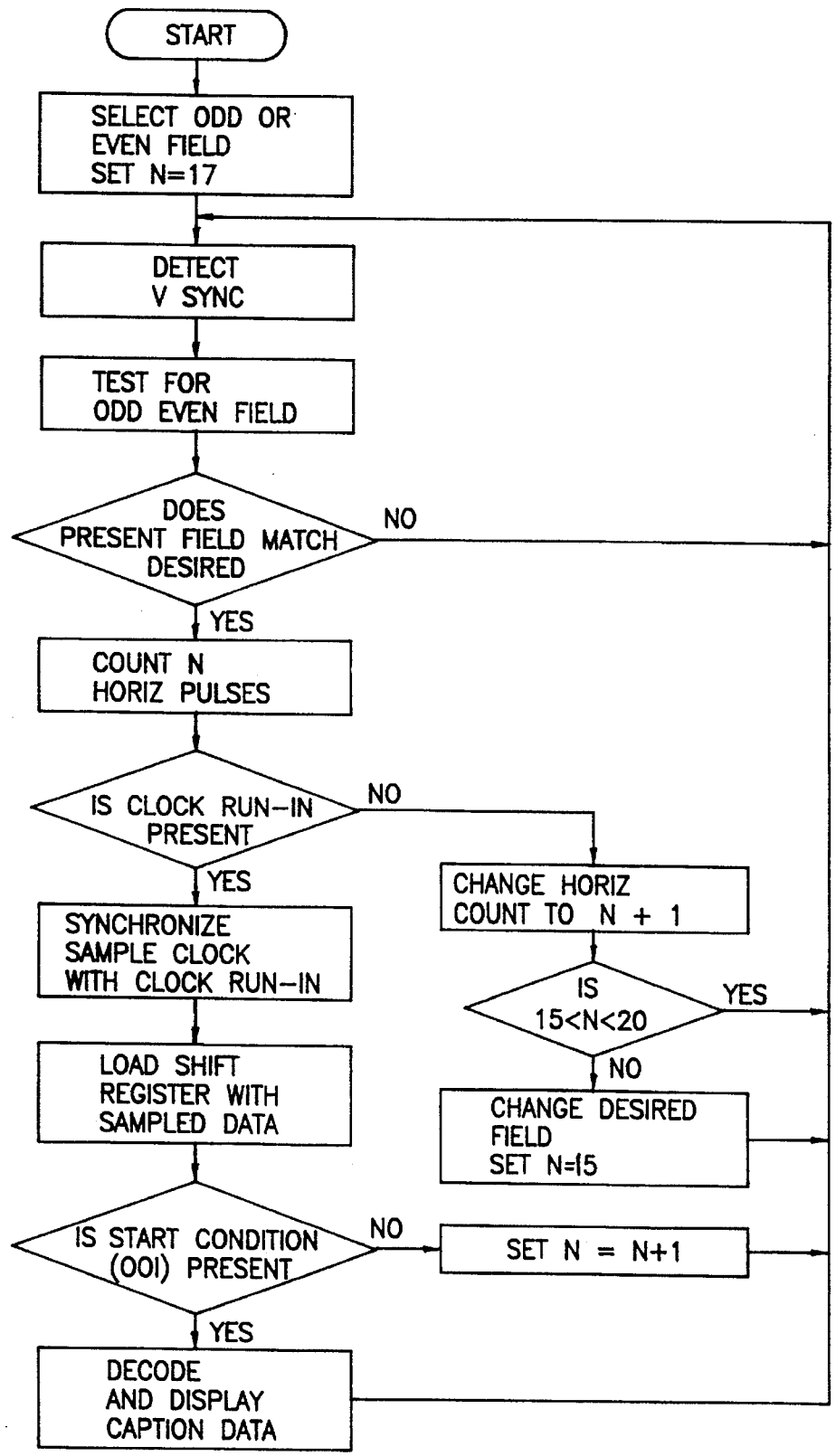
FIG. 3 is a flow chart of an operation of a conventional caption line finding circuit for a video signal processor.
Figure 4:
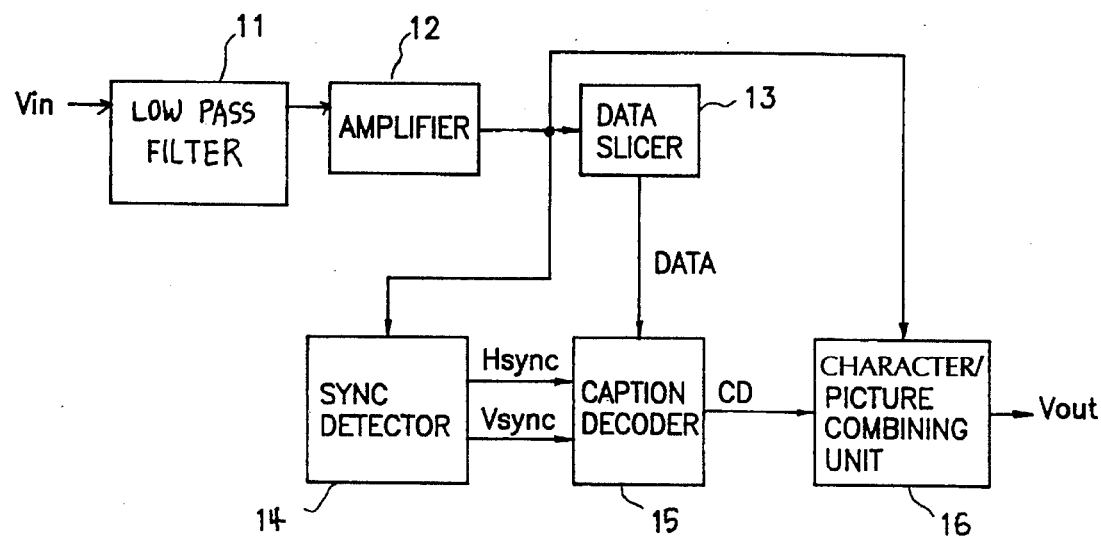
FIG. 4 is a block diagram of a caption line finding circuit for a video signal processor according to the present invention.
Figure 5:
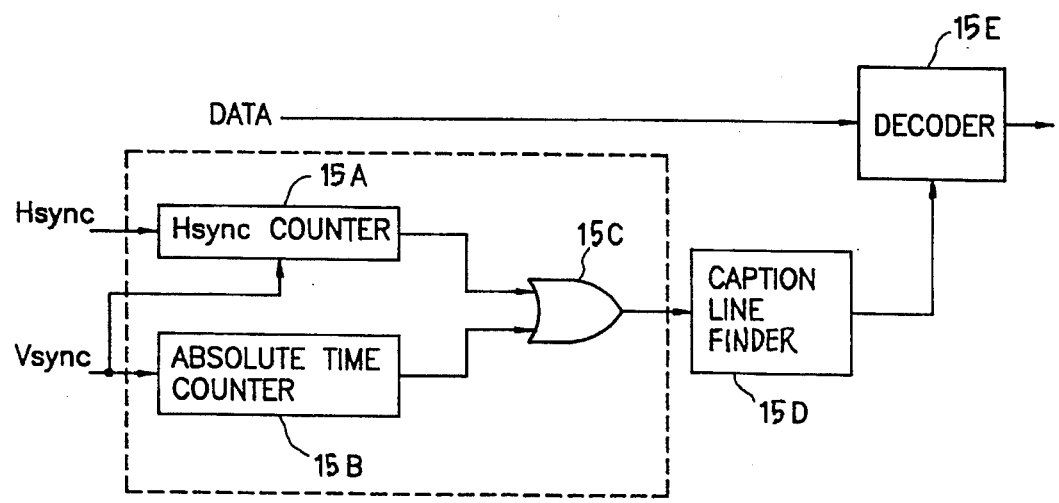
FIG. 5 is a block diagram of the caption decoder of FIG. 4.

Referring to FIG. 4, a caption line finding circuit for a video signal processor according to the present invention includes a low pass filter 11 for passing a certain signal for filtering a noise from a video signal Vin inputted thereto, an amplifier 12 for amplifying a video signal to a predetermined level, a data slicer 13 for outputting a video signal, in a certain unit of data, outputted from the amplifier 12, a synchronous signal detector 14 for detecting a vertical synchronous signal Vsync and a horizontal synchronous signal Hsync from a pictorial signal outputted from the amplifier 12, a caption decoder 15 for counting the horizontal synchronous signal Hsync inputted thereto after the vertical synchronous signal Vsync is outputted from the synchronous signal detector 14 and for counting the absolute time of the horizontal synchronous signal and detecting a caption data CD contained in a 21st scanning line from the data outputted from the data slicer 13 using a signal obtained by ORing the above described two counted values, and a character/picture combining unit 16 for combining the caption data outputted from the caption decoder 15 and the video data inputted thereto.

The operation of a caption line finding circuit for a video signal processor according to the present invention will now be explained.

When a video signal Vin is inputted to the low pass filter 11, the low pass filter 11 filters a noise component contained in the video signal. Thereafter, the amplifier 12 amplifies the noise-filtered pictorial signal to a predetermined level and outputs the amplified signal to the data slicer 13 and the synchronous signal detector 14. The data slicer 13 slices the video signal into a certain data unit and outputs the video signal to the caption decoder 15. Meanwhile, the synchronous signal detector 14 detects the vertical synchronous signals and the horizontal synchronous signals from the pictorial data outputted from the amplifier 12. When the vertical synchronous signal inputted to the caption decoder 15, the caption decoder 15 counts the number of the horizontal synchronous signal inputted thereto and counts the absolute time of the horizontal synchronous signal and ORs the counted two values and detects the 21st scanning line from the pictorial of a field using the ORed signal.

The operation of the caption decoder 15 will now be explained in more detail.

When a vertical synchronous signal outputted from the synchronous signal detector 14 is inputted, the horizontal synchronous counter 15A of the caption decoder 15 counts the number of the horizontal synchronous signals and outputs the signal of a high level while a 21st horizontal synchronous signal is present. In addition, the absolute time counter 15B counts the absolute time with respect to a 20th horizontal synchronous signal after a vertical synchronous signal is inputted thereto irrespective of the horizontal synchronous counter 15A and outputs a signal of a high level at the time when the 21st horizontal synchronous signal is present. Here, the absolute time corresponds to the values obtained by counting each horizontal synchronous signal after the vertical synchronous signal is inputted if the horizontal synchronous signal is inputted without delay.

As described in FIGS. 6A through 6D and 7A through 7E, the OR-gate 15C ORs the signals shown in FIGS. 7C and 7D and outputs the signal shown in FIG. 7E. The caption line finder 15D finds a certain interval of a signal of a high level outputted from the OR-gate 15C and recognizes the interval in which a caption line in contained, the decoder 15E decodes the data, corresponding to the interval of a signal of a high level outputted from the caption line finder, from the data outputted from the data slicer 13.

The decoded caption data are outputted to the character/picture combining unit 16. The character/picture combining unit 16 combines the caption data outputted from the caption decoder 15 and the pictorial signals outputted from the amplifier 12 and displays the combined data on the screen in characters. The reason there is a time delay Td (FIG. 7A) in the horizontal synchronous signal is to correctly detect the caption line by elongating the interval in which a caption data is detected in case that the state of a tape is bad or a large time delay of a horizontal synchronous signal is present due to an erroneous tape or due to erroneous broadcasting signals. In addition, as shown in FIG. 7D, the reason of counting the absolute time with respect to the horizontal synchronous signals up to the 20th signal after a vertical synchronous signal is detected is for when the time delay of the horizontal synchronous signal does not happen. That is, it is directed to prevent the data that is cut in a time delay interval Td if the caption data is detected in the interval shown in FIG. 7C, from being missed when the time delay of the horizontal synchronous signal does not happen.

As described above, the caption line finding circuit for a pictorial signal processor according to the present invention is directed to correctly finding a caption line irrespective of a tape elongation or a time delay which may be present. The interval in which caption data is detected is extended to the time of occurrence of a 21st horizontal synchronous signal that has been delayed for a certain time Td from when the 21st horizontal synchronous signal should have occurred. In addition, in the case that a caption signal, obtained by counting to the 21st horizontal synchronous signal in a signal is present after a certain delay time, more correct finding of a caption line is made possible using a signal obtained by counting an absolute time from the vertical synchronous signal in the event a horizontal synchronous signal is missed.

What is claimed is:

1. In a circuit capable of extracting caption data of a horizontal scanning line of a video signal, a caption line finding circuit comprising:

synchronous signal detecting means for detecting a vertical synchronous signal and a horizontal synchronous signal from a video signal applied thereto;

caption data slicing means for extracting caption data from the video signal applied thereto;

caption line detecting means for detecting a predetermined scanning line carrying caption data by counting a predetermined time from the time when the vertical synchronous signal is applied thereto, and outputting a caption line finding signal for a predetermined duration thereafter; and decoding means for decoding the caption data extracted by the caption data slicing means during the duration of the caption line finding signal outputted by the caption line detecting means.

2. The circuit of claim 1, wherein said caption line detecting means comprises:

an absolute time counter for counting a predetermined time from a time when the vertical synchronous signal from the synchronous signal detecting means is applied thereto, and outputting the caption line finding signal for a scanning time of one scanning line thereafter.

3. The circuit of claim 1, further comprising:

low pass filtering means for filtering noise contained in the video signal inputted thereto, and outputting the filtered video signal to the synchronous signal detecting means and the caption data slicing means.

4. A circuit for extracting a data of a certain horizontal scanning line in a video signal, comprising;

a first counter for counting a horizontal synchronous signal from a time a vertical synchronous signal of said video signal is inputted thereto, and outputting a first output signal for a first predetermined duration thereafter;

a second counter for counting a predetermined time from the time when said vertical synchronous signal of the video signal is inputted thereto, and outputting a second signal for a second predetermined duration thereafter, and a logic unit for logically operating the first and second output signals of said first and second counters.

5. The circuit of claim 1, further comprising:

character and picture combining means for combining the decoded caption data from the decoding means into the video signal applied thereto.

6. A caption line finding circuit which is capable of extracting caption data from a horizontal scanning line of a video signal carrying said caption data, comprising:

synchronous signal detecting means for detecting a vertical synchronous signal and a horizontal synchronous signal from a video signal applied thereto;

caption data slicing means for extracting a caption data from the video signal applied thereto;

caption line detecting means for detecting a predetermined scanning line by counting a predetermined time and a predetermined number of horizontal synchronous signals, respectively, from the time the vertical synchronous signal from the synchronous signal detecting means is applied thereto, and outputting a caption finding signal for a predetermined duration thereafter in response to the counted time and number; and decoding means for decoding the caption data extracted by the caption data slicing means for the duration of the caption line finding signal outputted by the caption line detecting means.

7. The circuit of claim 6, wherein said caption line detecting means further comprises:

a horizontal synchronous signal counter for counting the horizontal synchronous signal from a time when the vertical synchronous signal of the video signal is applied thereto, and outputting a first output signal for a first predetermined duration thereafter;

an absolute time counter for counting a predetermined time from the time when the vertical synchronous signal of the video signal is applied thereto, and outputting a second output signal for a second predetermined duration thereafter; and a logic unit for outputting the caption line finding signal for a third predetermined duration by logically operating first and second output signals from the horizontal synchronous signal counter and the absolute time counter.

8. The circuit of claim 7, wherein said logic unit outputs the caption line finding signal when either one of the first and second output signals from the horizontal synchronous signal counter and the absolute time counter or both is applied thereto.

9. The circuit of claim 6, further comprising:

low pass filtering means for filtering noise contained in the video signal inputted thereto, and outputting the filtered video signal to the synchronous signal detecting means and the caption data slicing means.

10. The circuit of claim 6, further comprising:

character and picture combining means for combining the udecoded caption data from the decoding means into the video signal applied thereto.

11. A method of extracting caption data from a horizontal scanning line of a video signal carrying said caption data, comprising:

a synchronous signal detecting step of detecting vertical and horizontal synchronous signals from a video signal;

a caption data slicing step of extracting caption data from the video signal;

a caption line detecting step of detecting a predetermined scanning line by counting a predetermined time from a time when the vertical synchronous signal is detected at the synchronous signal detecting step, and outputting a caption line finding signal for a predetermined duration thereafter; and a decoding step of decoding the caption data obtained at the caption data slicing step during the duration of the caption line finding signal outputted at the caption line detecting step.

12. The method of claim 11, further comprising:

a character and picture combining step of combining the decoded caption data from the decoding step into the video signal.

13. The method of claim 11, wherein the caption line detecting step is replaced by the sub-steps of:

detecting a predetermined scanning line by counting a predetermined time and a predetermined number of horizontal synchronous signals, respectively, from the time when the vertical synchronous signal is obtained at the synchronous signal detecting step; and outputting the caption line finding signal for the predetermined duration thereafter, in response to the counted time and number.

14. The method of claim 13, wherein, in said step of outputting the caption line finding signal, the caption line finding signal is outputted responsive to either the counted time or the counted number, or both.

* * * * *